United States Patent
Hasegawa

(10) Patent No.: US 9,538,018 B2
(45) Date of Patent: Jan. 3, 2017

(54) MFP FOR SCANNING DELIVERY ADDRESS INFORMATION AND FOR RECEIVING IMAGES FROM A SERVER TO BE PRINTED WITH THE DELIVERY ADDRESS

(71) Applicant: BROTHER KOGYO KABUSHIKI KAISHA, Nagoya-shi, Aichi-ken (JP)

(72) Inventor: Tomohiko Hasegawa, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 40 days.

(21) Appl. No.: 14/628,927

(22) Filed: Feb. 23, 2015

(65) Prior Publication Data
US 2015/0242735 A1 Aug. 27, 2015

(30) Foreign Application Priority Data
Feb. 24, 2014 (JP) .................. 2014-032964

(51) Int. Cl.
*G06F 3/12* (2006.01)
*H04N 1/00* (2006.01)

(52) U.S. Cl.
CPC .............. *H04N 1/00* (2013.01); *G06F 3/1204* (2013.01); *G06F 3/1256* (2013.01); *G06F 3/1258* (2013.01); *G06F 3/1288* (2013.01)

(58) Field of Classification Search
CPC ..... G06F 3/1256; G06F 3/1204; G06F 3/1258
See application file for complete search history.

(56) References Cited

U.S. PATENT DOCUMENTS

2002/0029153 A1* 3/2002 Lee .................... G06Q 10/0833
705/333
2004/0001226 A1* 1/2004 Ohtuka ................. G06F 3/1292
358/1.15

FOREIGN PATENT DOCUMENTS

JP 8-164652 A 6/1996
JP 2008-229993 A 10/2008

* cited by examiner

*Primary Examiner* — Benjamin O Dulaney
(74) *Attorney, Agent, or Firm* — Merchant & Gould P.C.

(57) ABSTRACT

A non-transitory storage medium stores instructions executable by an information processing server communicable with a device capable of executing a print processing and a scan processing. A delivery address and a second surface image are to be printed on first and second surfaces of a delivery object. First feature information indicates a feature of the second surface image. The information processing server reads delivery address information and the first feature information associated with each other, when scan information is newly received. The information processing server extracts sample image information when the read delivery address information is the same as the delivery address information contained in the newly-received scan information. The sample image information is for displaying a sample image corresponding to the second surface image having a feature indicated by the first feature information associated with the read delivery address information.

10 Claims, 10 Drawing Sheets

MFP FOR SCANNING DELIVERY ADDRESS INFORMATION AND FOR RECEIVING IMAGES FROM A SERVER TO BE PRINTED WITH THE DELIVERY ADDRESS

CROSS REFERENCE TO RELATED APPLICATION

The present application claims priority from Japanese Patent Application No. 2014-032964, which was filed on Feb. 24, 2014, the disclosure of which is herein incorporated by reference in its entirety.

BACKGROUND

1. Technical Field

The present invention relates to an information processing server configured to communicate with a device capable of executing a print processing and a scan processing, a communication system, and a non-transitory storage medium storing a plurality of instructions executable by a processor of the information processing server.

2. Description of the Related Art

There is known a communication system including a web server and an image forming apparatus capable of executing a print processing and a scan processing, and the image forming apparatus receives display information from the web server and displays a web page based on the display information, allowing a user to select a desired printing image (i.e., a desired image to be printed) displayed on the web page.

SUMMARY

In the above-described communication system, various kinds of display information can be received from the web server, and the user of the image forming apparatus can select a desired one of various kinds of printing images. However, increase in the number of printing images places a heavier burden on the user selecting the printing image. Accordingly, an aspect of the disclosure relates to a technique for reducing the burden on the user selecting an image.

In one aspect of the disclosure, a non-transitory storage medium stores a plurality of instructions executable by a processor of an information processing server. The information processing server includes the processor and a communication device configured to communicate with a device capable of executing a print processing and a scan processing. The plurality of instructions, when executed by the processor, cause the information processing server to: receive scan information from the device via the communication device, the scan information relating to a reading object on which a delivery address to be printed on a first surface of a delivery object is described, the scan information being acquired in the scan processing executed by the device for the reading object; transmit content information to the device via the communication device, the content information including sample image information for displaying a plurality of sample images respectively corresponding to a plurality of second surface images including a second surface image to be printed on a second surface of the delivery object; receive identifying information from the device via the communication device, the identifying information identifying a sample image selected on the device among the plurality of sample images displayed using the sample image information of the transmitted content information; acquire first surface image information for identifying a first surface image created based on the received scan information, the first surface image being for printing of the delivery address on the first surface of the delivery object; acquire second surface image information for identifying the second surface image to be printed on the second surface of the delivery object, the second surface image corresponding to the sample image identified by the received identifying information; transmit the acquired first surface image information and the acquired second surface image information to the device via the communication device; associate (a) delivery address information indicating the delivery address and included in the scan information used for creation of the first surface image information and (b) first feature information indicating a feature of the second surface image corresponding to the acquired second surface image information, with each other and output the delivery address information and the first feature information to a memory; read the delivery address information and the first feature information associated with each other, from the memory when scan information which is newer than the received scan information is newly received; and extract sample image information when the read delivery address information is identical with the delivery address information included in the newly-received scan information, the sample image information being for displaying a sample image corresponding to the second surface image including the feature indicated by the first feature information associated with the read delivery address information.

In another aspect of the disclosure, a communication system includes: a device capable of executing a print processing and a scan processing; and an information processing server including: a communication device configured to communicate with the device; and a controller configured to: receive scan information from the device via the communication device, the scan information relating to a reading object on which a delivery address to be printed on a first surface of a delivery object is described, the scan information being acquired in the scan processing executed by the device for the reading object; transmit content information to the device via the communication device, the content information including sample image information for displaying a plurality of sample images respectively corresponding to a plurality of second surface images including a second surface image to be printed on a second surface of the delivery object; receive identifying information from the device via the communication device, the identifying information identifying a sample image selected on the device among the plurality of sample images displayed using the sample image information of the transmitted content information; acquire first surface image information for identifying a first surface image created based on the received scan information, the first surface image being for printing of the delivery address on the first surface of the delivery object; acquire second surface image information for identifying the second surface image to be printed on the second surface of the delivery object, the second surface image corresponding to the sample image identified by the received identifying information; transmit the acquired first surface image information and the acquired second surface image information to the device via the communication device; associate (a) delivery address information indicating the delivery address and included in the scan information used for creation of the first surface image information and (b) first feature information indicating a feature of the second surface image corresponding to the acquired second surface image information, with each other and output the delivery address information and the first feature information to a memory;

read the delivery address information and the first feature information associated with each other, from the memory when scan information which is newer than the received scan information is newly received; and extract sample image information when the read delivery address information is identical with the delivery address information included in the newly-received scan information, the sample image information being for displaying a sample image corresponding to the second surface image including the feature indicated by the first feature information associated with the read delivery address information.

In another aspect of the disclosure, an information processing server includes: a communication device configured to communicate with a device capable of executing a print processing and a scan processing; and a controller configured to: receive scan information from the device via the communication device, the scan information relating to a reading object on which a delivery address to be printed on a first surface of a delivery object is described, the scan information being acquired in the scan processing executed by the device for the reading object; transmit content information to the device via the communication device, the content information including sample image information for displaying a plurality of sample images respectively corresponding to a plurality of second surface images including a second surface image to be printed on a second surface of the delivery object; receive identifying information from the device via the communication device, the identifying information identifying a sample image selected on the device among the plurality of sample images displayed using the sample image information of the transmitted content information; acquire first surface image information for identifying a first surface image created based on the received scan information, the first surface image being for printing of the delivery address on the first surface of the delivery object; acquire second surface image information for identifying the second surface image to be printed on the second surface of the delivery object, the second surface image corresponding to the sample image identified by the received identifying information; transmit the acquired first surface image information and the acquired second surface image information to the device via the communication device; associate (a) delivery address information indicating the delivery address and included in the scan information used for creation of the first surface image information and (b) first feature information indicating a feature of the second surface image corresponding to the acquired second surface image information, with each other and output the delivery address information and the first feature information to a memory; read the delivery address information and the first feature information associated with each other, from the memory when scan information which is newer than the received scan information is newly received; and extract sample image information when the read delivery address information is identical with the delivery address information included in the newly-received scan information, the sample image information being for displaying a sample image corresponding to the second surface image including the feature indicated by the first feature information associated with the read delivery address information.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENT

Embodiment

Figure 1:
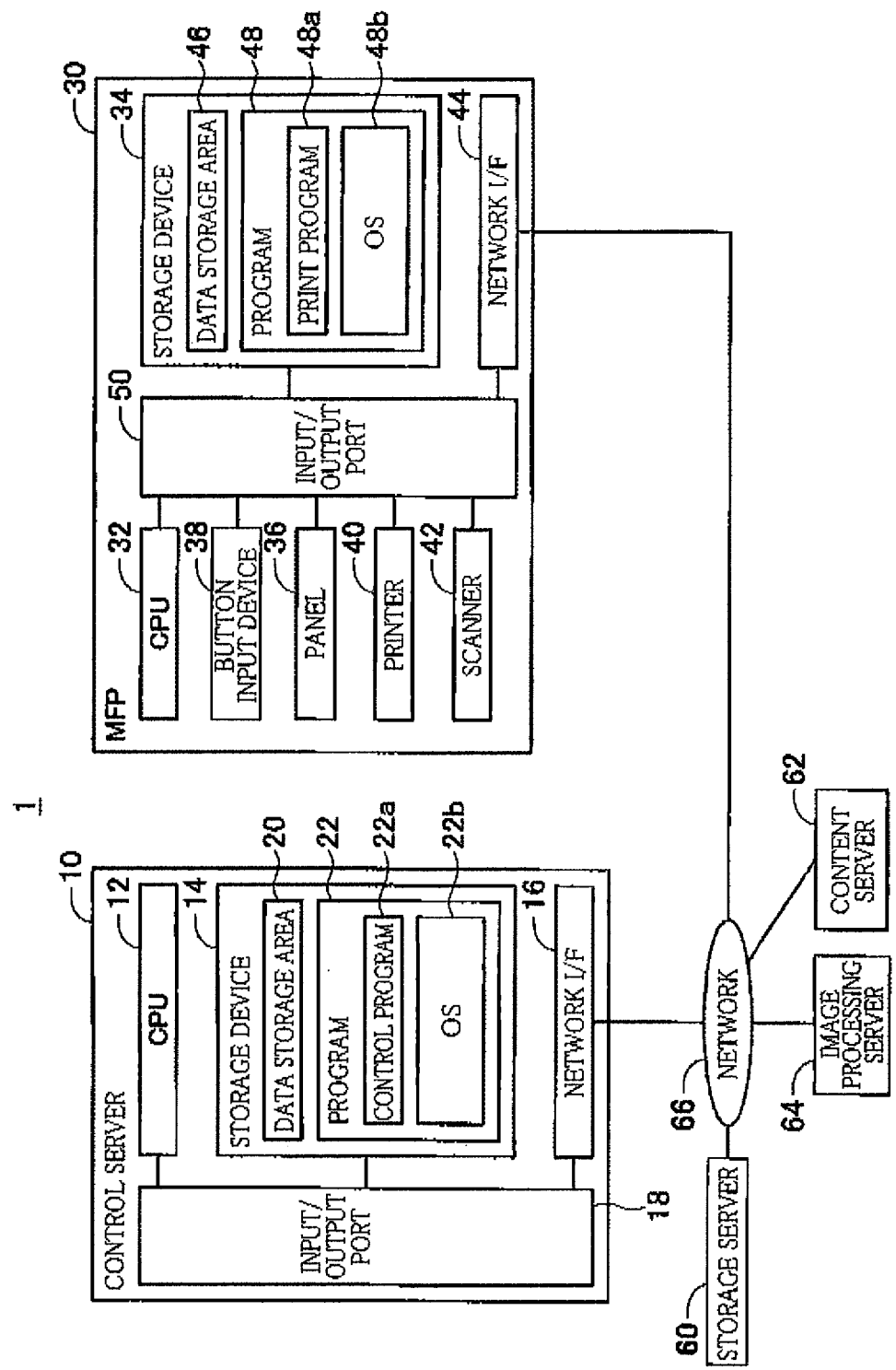
FIG. 1 is a block diagram illustrating a communication system.

Hereinafter, there will be described a communication system 1 according to one embodiment with reference to FIG. 1. The communication system 1 includes a control server 10, an MFP (Multi-function Peripheral) 30, a storage server 60, a content server 62, an image processing server 64, and a network 66. The storage server 60 stores various kinds of data and offers them over the network 66. The content server 62 stores image data and offers them over the network 66. The image processing server 64 is configured to process image data and connected to the network 66.

The control server 10 includes a CPU (Central Processing Unit) 12, a storage device 14, and a network I/F 16. These devices are communicable with each other via an input/output port 18.

The CPU 12 executes processings according to a program 22 stored in the storage device 14. Hereinafter, the CPU 12 that executes programs such as a control program 22a and an operating system 22b may be simply referred to as the name of the program. For example, the wording "the control program 22a executes" may mean "the CPU 12 that executes the control program 22a executes". It is noted that the storage device 14 is constituted by various devices in combination which include a RAM (Random Access Memory), a ROM (Read Only Memory), a flash memory, a HDD (hard disk), and a buffer included in the CPU 12.

The storage device 14 stores the program 22. The program 22 includes the control program 22a and the operating system 22b (hereinafter may be simply referred to as "OS 22b"). The control program 22a is a program for data communication with the MFP 30, the storage server 60, the content server 62, and the image processing server 64. The storage device 14 may be a storage medium readable by a computer. The storage medium readable by the computer is one kind of a medium readable by the computer. Examples of the storage medium readable by the computer include a ROM, a RAM, a flash memory, and a hard disk. Each of the ROM, the RAM, the flash memory, and the hard disk is a non-transitory medium. Each of the ROM, the RAM, the flash memory, and the hard disk is a tangible medium. An electric signal for transferring programs downloaded from a server on the Internet is a signal medium readable by a computer as one kind of a medium readable by the computer but is not the storage medium readable by the computer.

The operating system 22b is a program which offers basic functions used by the control program 22a. The OS 22b includes programs for controlling devices such as the storage device 14.

The storage device 14 has a data storage area 20. The data storage area 20 stores various kinds of data and other data. The control program 22a causes the OS 22b to store various kinds of data into the data storage area 20 by outputting data for storing the various kinds of data into the data storage area 20. Alternatively, the control program 22a causes the OS 22b to acquire various kinds of data stored in the data storage area 20.

The network I/F 16 communicates with external devices over the network 66 and is connected to the MFP 30, the storage server 60, the content server 62, and the image processing server 64 over the network 66. This configuration allows the control server 10 to transmit and receive various kinds of data to and from the MFP 30, the storage server 60, the content server 62, and the image processing server 64.

The MFP 30 includes a CPU 32, a storage device 34, a panel 36, a button input device 38, a printer 40, a scanner 42, and a network I/F 44. These devices are communicable with each other via an input/output port 50.

The CPU 32 executes processings according to a program 48 stored in the storage device 34. The storage device 34 stores the program 48. The program 48 includes a print program 48a and an operating system 48b (hereinafter may be simply referred to as "OS 48b"). The print program 48a is a program for using the communication system 1 to print a New Year's card.

The operating system 48b is a program which offers basic functions used by the print program 48a. The OS 48b includes programs for controlling the storage device 34, the panel 36, and the button input device 38. The storage device 34 includes a data storage area 46.

The network I/F 44 communicates with external devices over the network 66 and is connected to the control server 10, the storage server 60, the content server 62, and the image processing server 64 over the network 66. This configuration allows the MFP 30 to transmit and receive various kinds of data to and from the control server 10, the storage server 60, the content server 62, and the image processing server 64.

The panel 36 has a display surface for displaying various kinds of functions of the MFP 30. The button input device 38 having a touch sensor is formed integrally with the panel 36 and configured to detect a touch and an approach of an input object on or toward the panel 36 to receive a button operation performed by a user. The printer 40 performs printing. The scanner 42 scans a document or the like placed on a document table, not shown, or a flat bed, not shown.

Here, definitions of "data" and "information" (or "information element") will be explained. In this specification, "information" is the superordinate of "data". Thus, "data A" may be replaced with "information A". Even where information elements differ from each other in format as "data" (e.g., a text format, a binary format, and a flag format), these information elements are considered as the same information as long as these elements are recognized to have the same meaning or content. For example, data "COPY=2" in the text format and data "COPY=10" in the binary format are the same information as long as these data are dealt with, by a device, as information indicating the number of copies are two. However, the data and the information are not strictly distinguished from each other and may be exceptionally dealt with.

Operations of Communication System

There will be next explained one example of operations of the communication system 1. The communication system 1 creates a New Year's card using image data stored in the content server 62. The printing of the New Year's card in the communication system 1 will be explained with reference to FIGS. 2-4.

Figure 2:
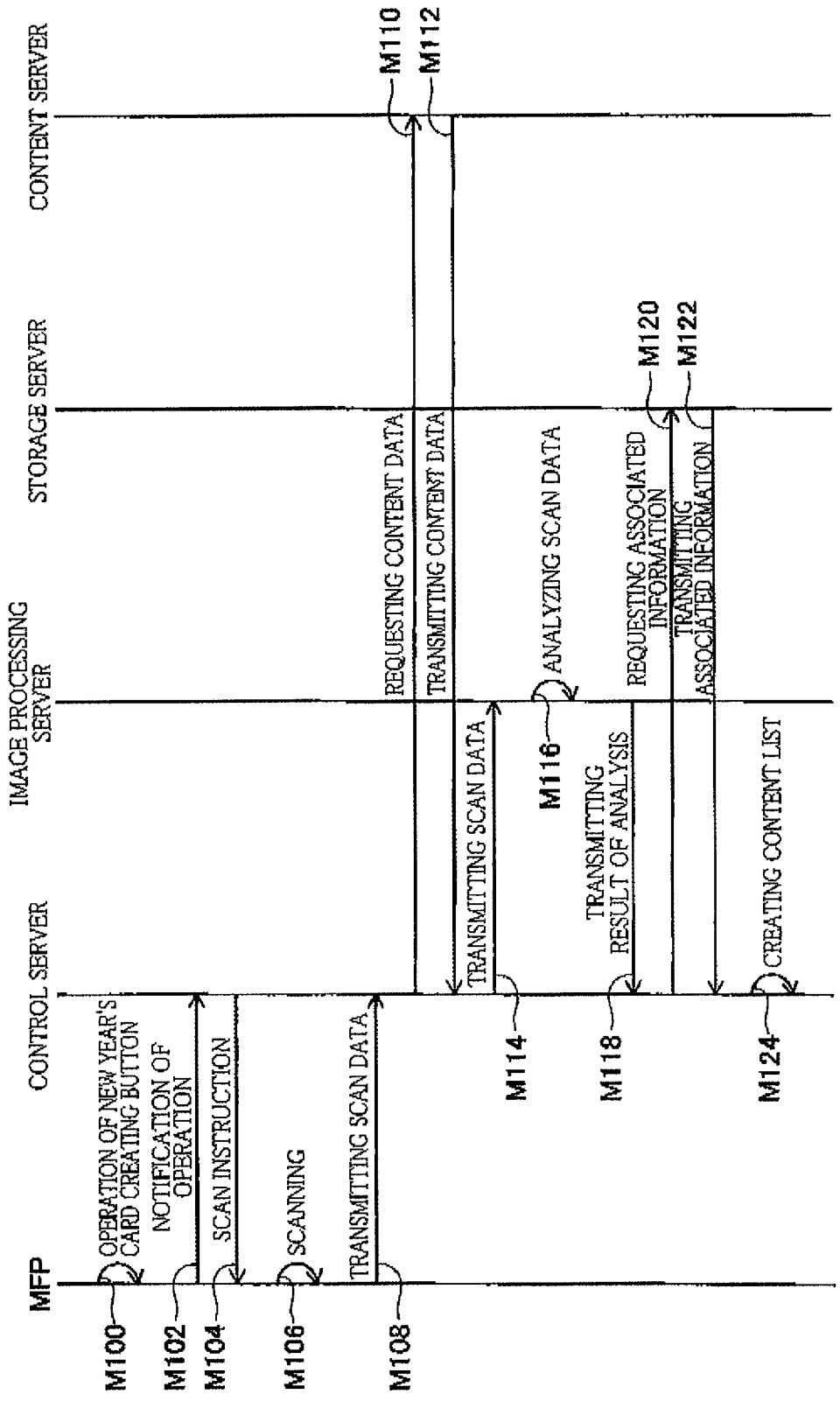
FIG. 2 is a sequence diagram illustrating operations of the communication system.
Figure 3:
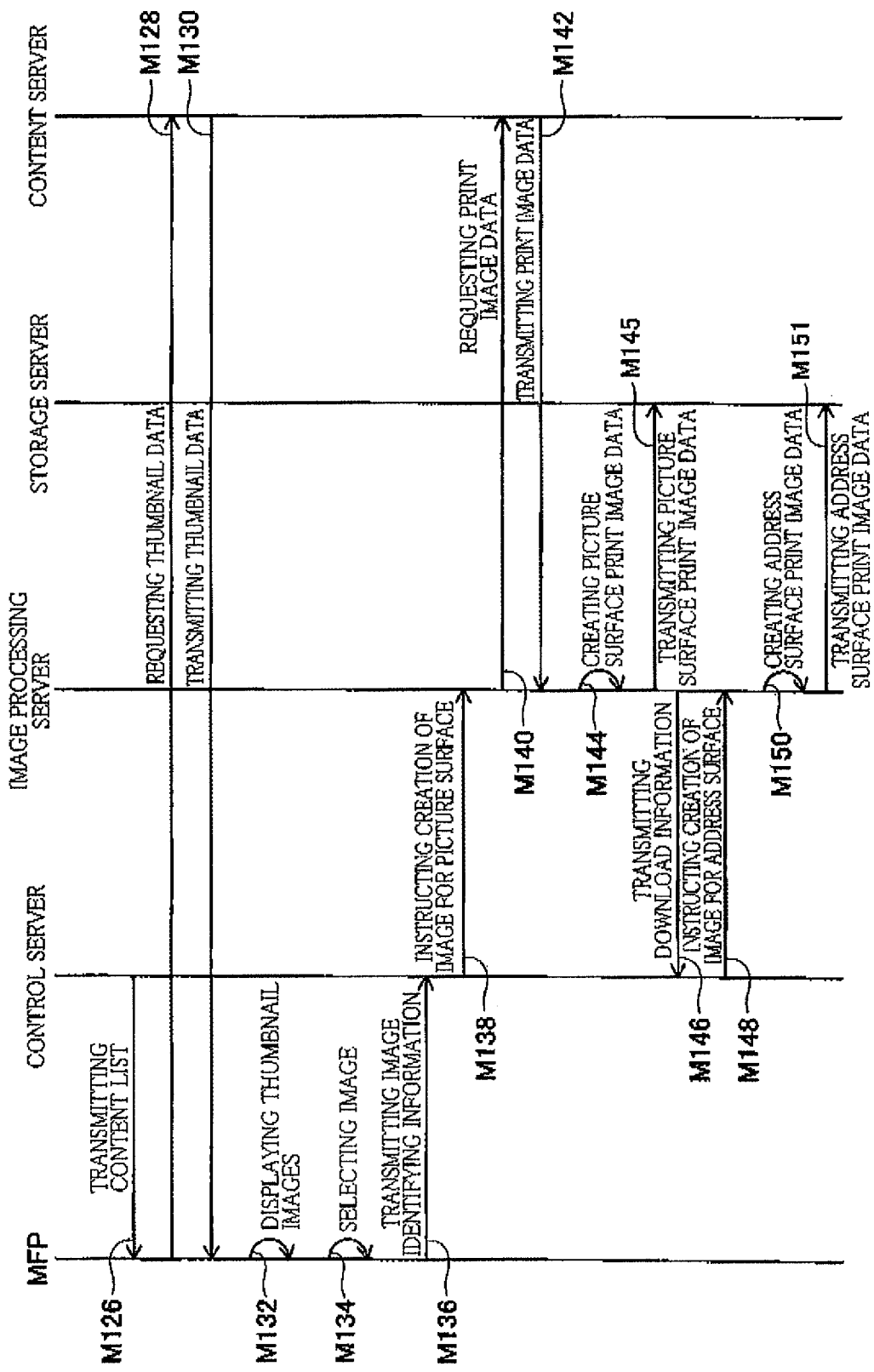
FIG. 3 is a sequence diagram illustrating operations of the communication system.
Figure 4:
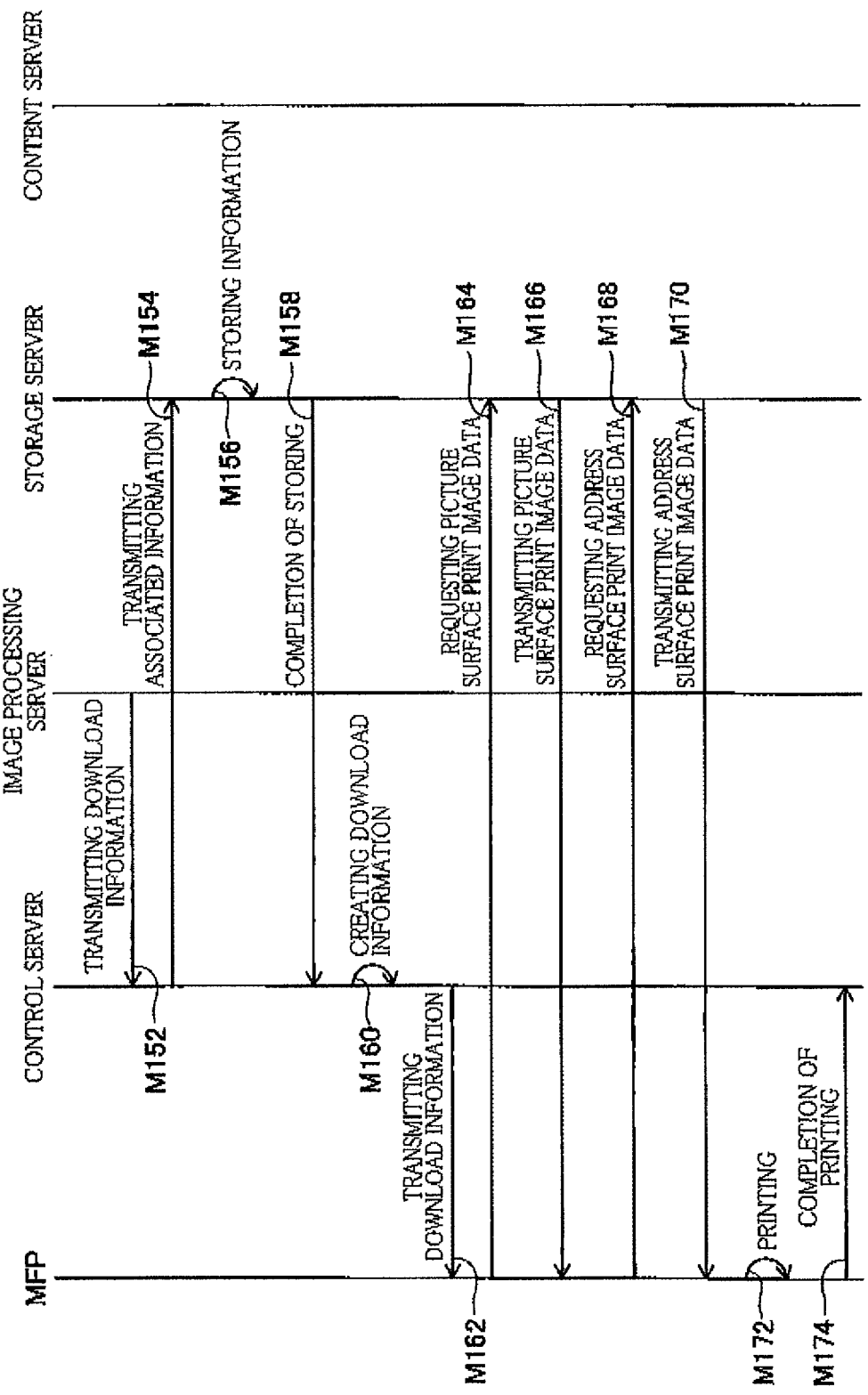
FIG. 4 is a sequence diagram illustrating operations of the communication system.

It is noted that information transferred between devices is indicated by an arrow in each of FIGS. 2-4. Also, the wording "information" may be omitted in FIGS. 2-4 and the explanation. For example, the content-data request information may be referred to simply as "content data request".

In the printing of the New Year's card in the communication system 1, the scanner 42 of the MFP 30 scans a document (as one example of a reading object) on which information regarding a destination and information regarding a sender are described. Based on scan data (as one example of scan information) created by the scan, the information regarding the destination (as one example of a delivery address) and the information regarding the sender are printed on an address surface (side) (as one example of a first surface) of a postcard (as one example of a delivery object). Thus, the user needs to enter the information regarding the destination and the information regarding the sender on a particular document before the printing of the New Year's card in the communication system 1.

Figure 5:
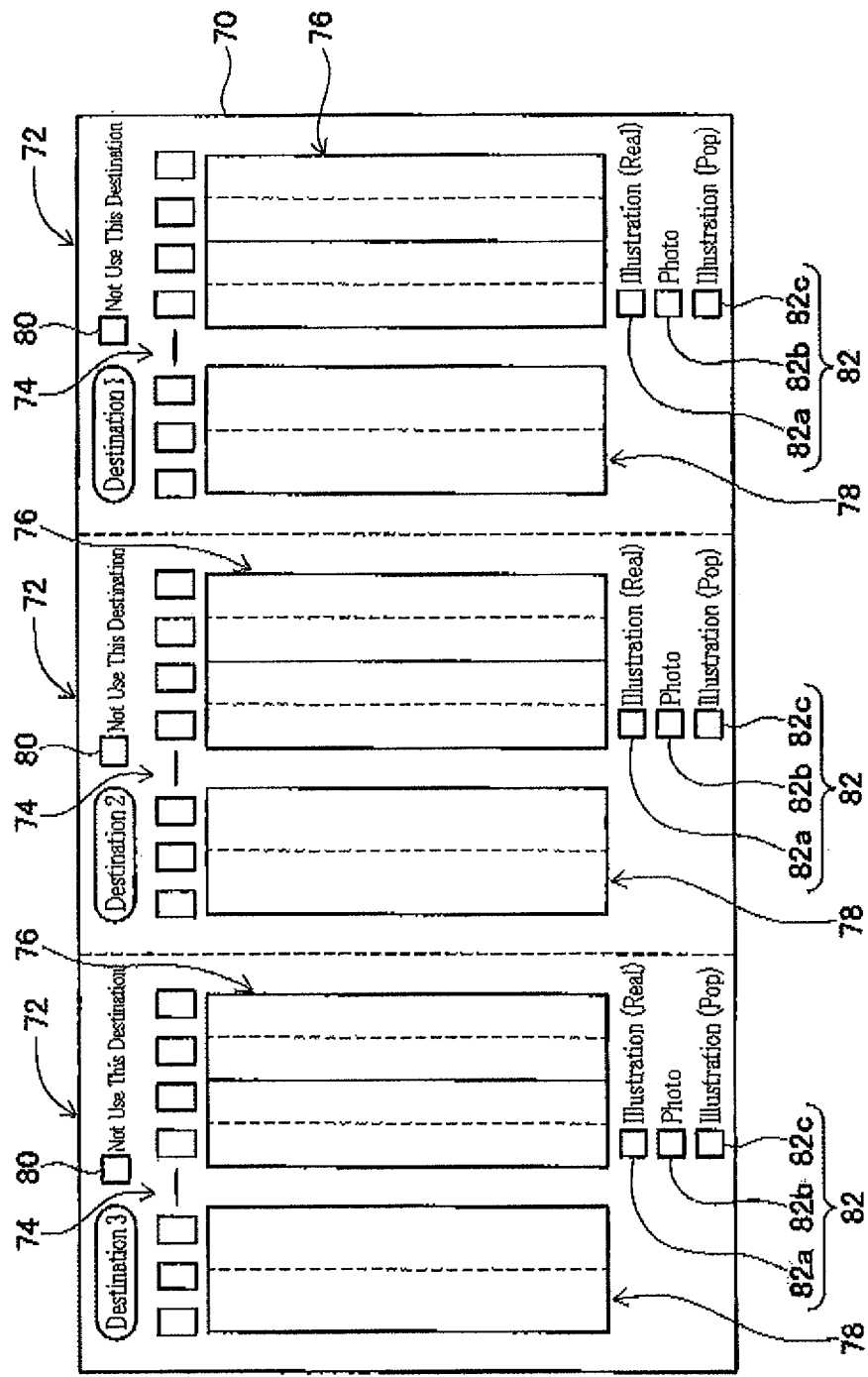
FIG. 5 is a view illustrating a destination document.
Figure 6:
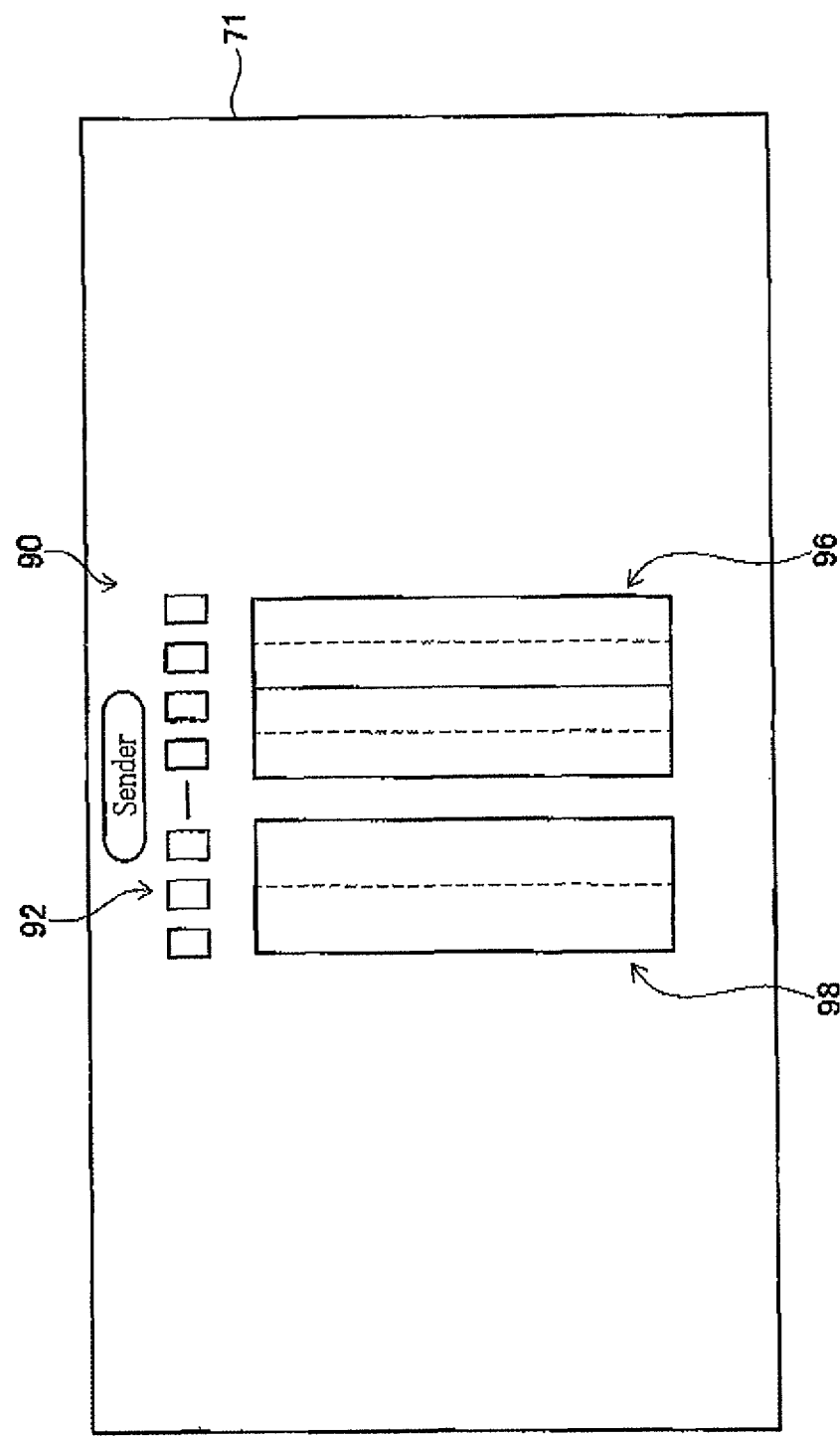
FIG. 6 is a view illustrating a sender document.

Specifically, the user can use a destination document 70 illustrated in FIG. 5 and a sender document 71 illustrated in FIG. 6. As illustrated in FIG. 5, the destination document 70 contains three destination information sections 72 each provided for the user to enter information regarding a destination. Each of the destination information sections 72 includes a zip code section 74, an address section 76, a name section 78, a disuse check box 80, and image feature check boxes 82.

The zip code section 74 is a field on which a zip code of an addressee is to be entered. The address section 76 is a field on which an address of the addressee is to be entered. The name section 78 is a field on which a name of the addressee is to be entered. The disuse check box 80 is an element the user checks in the case where the user does not want to print the information regarding the destination on the postcard. That is, the user checks the disuse check box 80 for a destination 2 in the case where information regarding, e.g., the address is described on the three destination information sections 72, but the New Year's card is not to be sent to the destination 2 of the destination information sections 72 for some reason, for example. As a result, the information regarding the destination 1 and the destination 3 of the destination information sections 72 is to be printed on the respective postcards, and the information regarding the destination 2 of the destination information sections 72 is not to be printed on the postcard.

Each of the image feature check boxes 82 is a check box which is used by the user to select an image having the same feature as that of an image (hereinafter may be referred to as "picture surface image" (as one example of a second surface image)) which is to be printed on a picture surface (side) (as one example of a second surface) of the postcard. The user can select an image from among images having a feature corresponding to the checked box. Specifically, images based on image data for printing as the picture surface images and images based on image data in the form of thumbnails (hereinafter may be referred to as "thumbnail data") are stored. The content server 62 stores the thumbnail data and print image data for each corresponding picture surface image. The MFP 30 retrieves a plurality of thumbnail data from the content server 62 to control the panel 36 to display a plurality of images (each hereinafter may be referred to as "thumbnail image" (as one example of a sample image) based on the plurality of thumbnail data, each of which is attached with a tag information element (as one example of a first feature) for identifying an image having the same feature as that of the thumbnail image.

Figure 7:
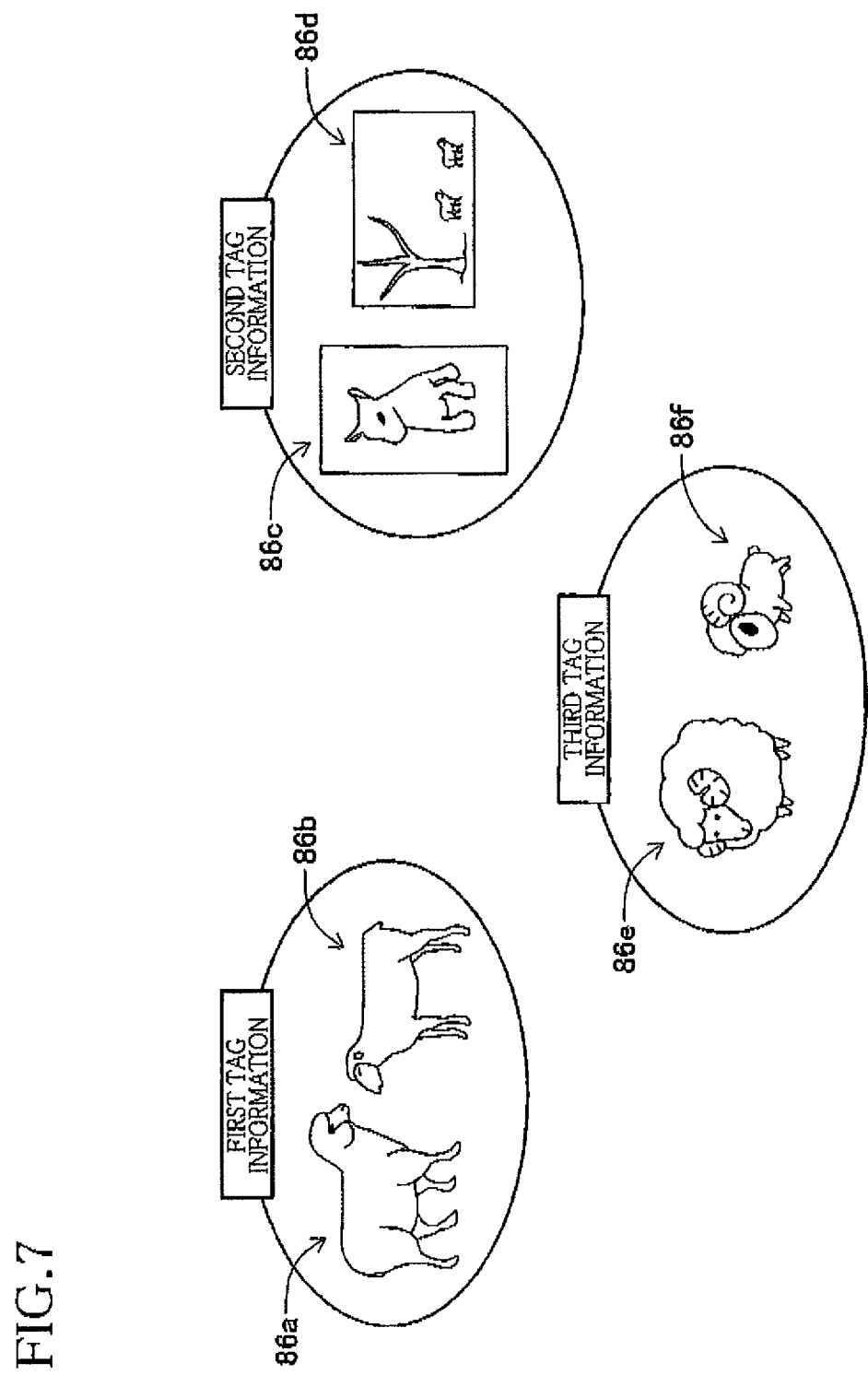
FIG. 7 is a view illustrating picture surface images for each tag information element.

Specifically, there will be explained the case where a sheep image is to be selected as the picture surface image, for example. The content server 62 stores thumbnail data indicative of a plurality of sheep images. Each of the thumbnail data is attached with one of three types of tag information elements. These three types of tag information elements include a first tag information element, a second tag information element, and a third tag information element. The first tag information element indicates a real illustration image of the plurality of sheep images and is as illustrated in FIG. 7 attached to thumbnail data respectively indicative of a first sheep image 86a and a second sheep image 86b. The second tag information element indicates a photo image of the plurality of sheep images and is as illustrated in FIG. 7 attached to thumbnail data respectively indicative of a third sheep image 86c and a fourth sheep image 86d. The third tag information element indicates a pop illustration image of the plurality of sheep images and is as illustrated in FIG. 7 attached to thumbnail data respectively indicative of a fifth sheep image 86e and a sixth sheep image 86f.

As illustrated in FIG. 5, the image feature check boxes 82 include three check boxes 82a-82c. The check box 82a is for selecting the real illustration image as the picture surface image. In the case where this check box 82a is selected, thumbnail images respectively corresponding to the first sheep image 86a and the second sheep image 86b in FIG. 7 are displayed when the panel 36 displays a plurality of images. The check box 82b is for selecting the photo image as the picture surface image. In the case where this check box 82b is selected, thumbnail images respectively corresponding to the third sheep image 86c and the fourth sheep image 86d in FIG. 7 are displayed when the panel 36 displays a plurality of images. The check box 82c is for selecting the pop illustration image as the picture surface image. In the case where this check box 82c is selected, thumbnail images respectively corresponding to the fifth sheep image 86e and the sixth sheep image 86f in FIG. 7 are displayed when the panel 36 displays a plurality of images.

As illustrated in FIG. 6, the sender document 71 contains a sender information section 90 provided for the user to enter information regarding one sender. The sender information section 90 includes a zip code section 92, an address section 96, and a name section 98. The zip code section 92 is a field on which a zip code of the sender is to be entered. The address section 96 is a field on which an address of the sender is to be entered. The name section 98 is a field on which a name of the sender is to be entered.

The user completes information on the document 70 or 71 and places the document 70 or 71 on the document table or the flat bed of the MFP 30. When a New Year's card creating button provided on the MFP 30 is operated by the user at M100 (see FIG. 2), a notification indicating pressing of the New Year's card creating button is at S102 transmitted from the MFP 30 to the control server 10. Upon receiving the notification indicating pressing of the New Year's card creating button, the control server 10 at M104 transmits a scan instruction to the MFP 30.

It is noted that the following processings are executed in advance of M100. When a server use button displayed on the panel 36 of the MFP 30 is touched by the user, information indicating the touch of the sewer use button is transmitted to the control server 10. When a response to this information is received from the control server 10, the MFP 30 controls the panel 36 to display a screen containing the New Year's card creating button and an image indicating placement of a document. It is noted that a scan button which is a hard button for receiving a scan start instruction from the user may also serve as the New Year's card creating button.

Upon receiving the scan instruction, the MFP 30 at M106 scans the document 70 or 71 placed on the document table or the flat bed. The MFP 30 at M108 sends the control server 10 scan data created by the scan. Upon receiving the scan data, the control server 10 at M110 sends the content server 62 a request of transmission of content data (as one example of content information). The content server 62 stores the plurality of thumbnail data as described above, and the content data is constituted by (i) thumbnail data download URLs (Uniform Resource Locators) (as one example of sample image information) for downloading the respective thumbnail data and (ii) identification IDs (each as one example of identifying information) used for the downloading.

It is noted that each of the thumbnail data download URLs is attached with tag information element corresponding to an thumbnail image based on thumbnail data to be downloaded using the URL. That is, for example, the first tag information element is attached to a thumbnail data download URL for retrieving thumbnail data indicative of the thumbnail image corresponding to the first sheep image 86a in FIG. 7. Each of the thumbnail data download URLs is attached with coloring information regarding a thumbnail image based on a thumbnail data to be downloaded using the URL. Specifically, each of the plurality of thumbnail data stored in the content server 62 is attached with coloring information (as one example of a second feature) for identifying a color or colors of the thumbnail image. That is, in the case where the thumbnail image corresponding to the first sheep image 86a in FIG. 7 is a mainly pink image, for example, the thumbnail data indicative of the thumbnail image corresponding to the first sheep image 86a is attached with coloring information indicating that a main color of the image is pink (noted that the coloring information may be hereinafter referred to as "pink coloring information"). Thus, not only the first tag information element but also the pink coloring information is attached to the thumbnail data download URL for acquiring the thumbnail data indicative of the thumbnail image corresponding to the first sheep image 86a in FIG. 7.

When the request of transmission of the content data is received from the control server 10, the content server 62 at M112 sends the control server 10 the content data constituted by (i) the thumbnail data download URL attached with the tag information element and the coloring information and (ii) an ID used for downloading. Upon receiving the content data, the control server 10 at M114 sends the image processing server 64 the scan data received from the MFP 30. The image processing server 64 at M116 analyzes the scan data.

In the analysis of the scan data by the image processing server 64, OCR (Optical Character Recognition) is performed for scan data indicative of the document 70 to form text data indicative of information relating to the addressee which is described on the zip code section 74, the address section 76, and the name section 78 (noted that this information may be hereinafter referred to as "addressee information element"). Also, in the analysis of the scan data by the image processing server 64, the presence or absence of a check on the disuse check box 80 is analyzed. Furthermore, the presence or absence of a check on one of the image feature check boxes 82 is analyzed, and when one of the image feature check boxes 82 is checked, the checked one of the three check boxes 82a-82c is analyzed or determined.

Upon completion of the analysis of the scan data by the image processing server 64, the image processing server 64 at M118 transmits the result of the analysis of the scan data to the control server 10. The result of the analysis contains the text data and information indicating which check box is checked. Upon receiving the result of the analysis, the control server 10 at M120 sends the storage server 60 a request of transmission of an associated information element. This associated information element contains the text data indicative of the addressee information element, the tag information element, and the coloring information which are associated with each other. The associated information element is created by the control server 10 and stored in the storage server 60.

In the control server 10, specifically, the tag information element and the coloring information regarding the picture surface image of each New Year's card previously created are associated with text data indicative of addressee information element (as one example of delivery address information) regarding the New Year's card to create the associated information element. That is, in the case where the first sheep image 86a illustrated in FIG. 7 is printed on a picture surface of the New Year's card whose addressee is "A", for example, the text data indicative of the addressee information element regarding the addressee A and the first tag information element are associated with the pink coloring information to create the associated information element. The control server 10 transmits the created associated information element to the storage server 60, and the associated information element is stored into the storage server 60. As thus described, each time when the New Year's card is created, the associated information element is created by the control server 10 and stored into the storage server 60.

When the request of transmission of the associated information element is received from the control server 10, the storage server 60 at M122 transmits the associated information element to the control server 10. The control server 10 at M124 creates a content list (as one example of content information) based on the associated information element and the result of the analysis of the scan data. The creation of the content list in the control server 10 is performed according to the control program 22a which is executed by the CPU 12 of the control server 10. There will be explained, with reference to FIGS. 8 and 9, processings executed according to the control program 22a executed by the CPU 12 of the control server 10.

Figure 8:
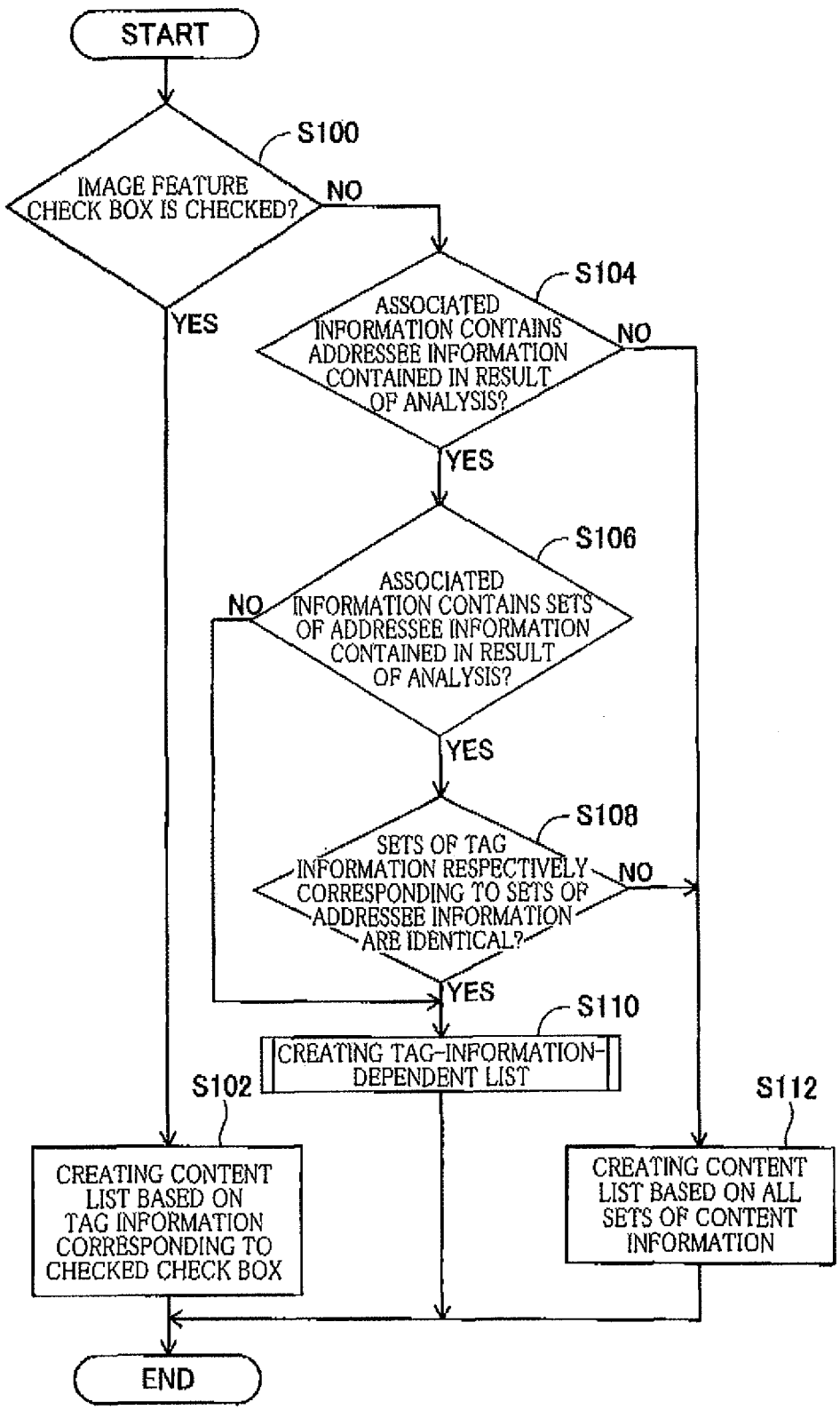
FIG. 8 is a flow chart illustrating processings executed by a control server.
Figure 9:
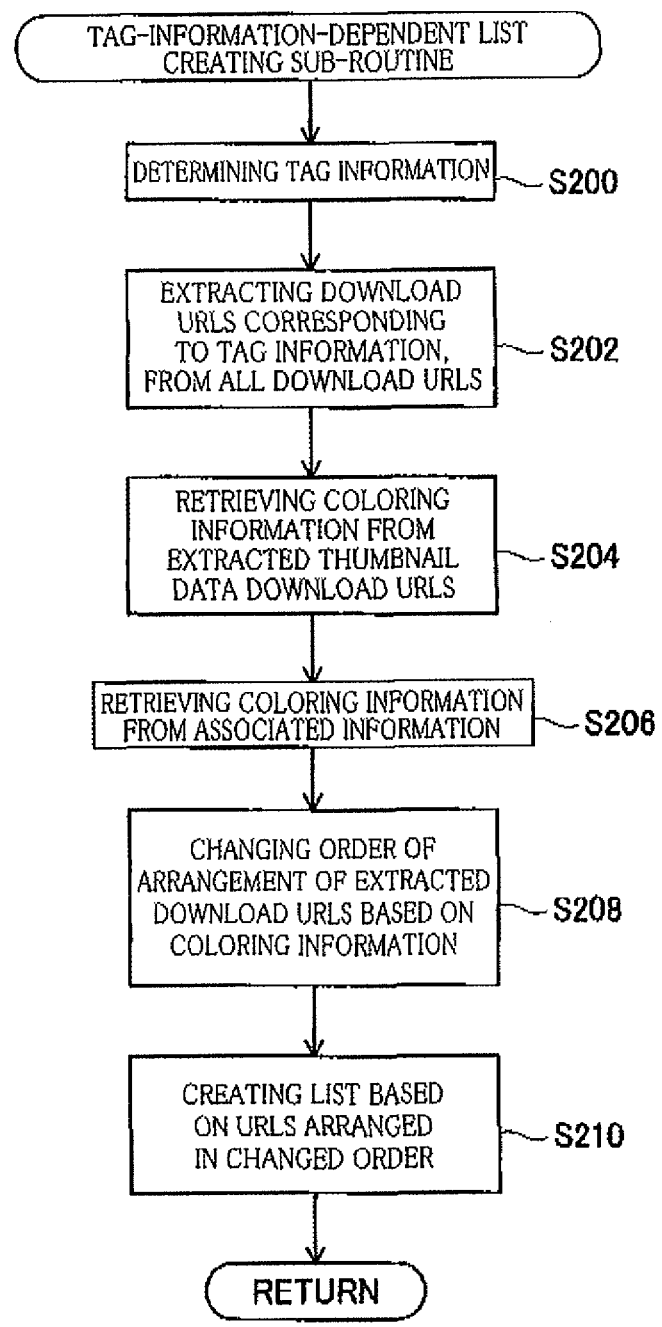
FIG. 9 is a flow chart illustrating processings executed by the control sewer.

When the associated information element is received by the control server 10 from the storage server 60, flows illustrated in FIGS. 8 and 9 begin. The flow illustrated in FIG. 8 begins with S100 at which the CPU 12 determines whether any of the image feature check boxes 82 of the document 70 is checked or not based on the result of analysis received from the image processing server 64. When any of the image feature check boxes 82 is checked, this flow goes to S102.

At S102, the CPU 12 determines which check box is checked among the three check boxes 82a-82c, based on the result of analysis received from the image processing server 64 and creates the content list based on a tag information element corresponding to the checked one of the check boxes 82a-82c. Specifically, the CPU 12 refers to tag information elements respectively attached to all the thumbnail data download URLs retrieved from the content server 62 and extracts the thumbnail data download URLs attached with the tag information element which is the same as that corresponding to the checked one of the check boxes 82a-82c. That is, the control server 10 can determine which tag information element the checked check box corresponds to. In the case where the check box 82a is checked, for example, the thumbnail data download URLs attached with the first tag information element are extracted from all the thumbnail data download URLs retrieved from the content server 62. The content list is then created based on the extracted thumbnail data download URLs and the identification IDs corresponding to the respective URLs, and this flow ends.

When any of the image feature check boxes 82 is not checked at S100, this flow goes to S104. The CPU 12 at S104 determines whether or not the text data indicative of the addressee information element regarding the associated information element retrieved from the storage server 60 contains text data (hereinafter may be referred to as "matched text data") indicating the same addressee as that of the addressee information element retrieved from the image processing server 64. Whether the text data contains the matched text data or not may be determined based on determination whether the text data is completely identical with the matched text data or not or based on determination whether the matched text data mostly identical with the matched text data or not. When the text data indicative of the addressee information element regarding the associated information element contains the matched text data, this flow goes to S106.

The CPU 12 at S106 determines whether the text data indicative of the addressee information element regarding the associated information element contains a plurality of the matched text data or not. When the text data indicative of the addressee information element regarding the associated information element contains a plurality of the matched text data, this flow goes to S108. Specifically, in the case where the New Year's cards have been created in the last year and the year before last for the addressee A using the communication system 1, for example, the storage server 60 stores the associated information element regarding the last year for the addressee A and the associated information element regarding the year before last for the addressee A. In the case where the document 70 on which the addressee information element regarding the addressee A is described is scanned in this year, the text data indicative of the addressee information element regarding the associated information element contains a plurality of the matched text data relating to the addressee A.

The CPU 12 at S108 retrieves tag information elements respectively corresponding to the plurality of matched text data and determines whether these tag information elements are identical with each other or not. When the tag information elements are identical with each other, this flow goes to S110. Specifically, in the case where the New Year's cards have been created in the last year and the year before last for the addressee A using the communication system 1, the tag information element is retrieved from the associated information element regarding the last year for the addressee A, and the tag information element is retrieved from the associated information element regarding the year before last for the addressee A. In this situation, for example, in the case where the tag information element indicative of the associated information element regarding the last year for the addressee A is the first tag information element, and the tag information element indicative of the associated information element regarding the year before last for the addressee A is the first tag information element, the CPU 12 determines that the tag information elements are identical with each other.

It is noted that this flow goes to S110 also in the case where it is determined at S106 that a plurality of matched text data are not contained in the text data indicative of the addressee information element regarding the associated information element. The CPU 12 at S110 executes a tag-information-dependent list creating sub-routine illustrated in FIG. 9. The flow of the tag-information-dependent list creating sub-routine begins with S200 at which the CPU 12 determines the tag information element which is used when creating the content list.

Specifically, in the case where only one matched text data is contained in the text data indicative of the addressee information element regarding the associated information element, for example, the CPU 12 retrieves a tag information element corresponding to the text data indicative of the addressee information element regarding the one associated information element and uses the tag information element for creation of the content list. That is, in the case where only one matched text data relating to the addressee A is contained in the text data indicative of the addressee information element regarding the associated information element, and the tag information element corresponding to the matched text data relating to the addressee A is the first tag information element, the first tag information element is used for the creation of the content list.

Also, in the case where a plurality of matched text data are contained in the text data indicative of the addressee information element regarding the associated information element, for example, the CPU 12 retrieves a plurality of tag information elements respectively corresponding to the text data indicative of the addressee information elements respectively regarding the plurality of associated information elements. Since the CPU 12 at S108 determines that these tag information elements are identical with each other, these identical tag information elements are used for the creation of the content list. That is, in the case where two matched text data relating to the addressee A are contained in the text data indicative of the addressee information element regarding the associated information element, and tag information elements respectively corresponding to the two matched text data relating to the addressee A are the first tag information element, the first tag information element is used for the creation of the content list.

When the tag information element used for the creation of the content list is determined, the CPU 12 at S202 refers to the tag information elements attached to all the thumbnail data download URLs retrieved from the content server 62 and extracts the thumbnail data download URLs attached with the tag information element determined in the above-described processing. That is, in the case where the first tag information element is determined as the tag information element used for the creation of the content list in the processing at S108, for example, the CPU 12 extracts the thumbnail data download URLs attached with the first tag information element, from all the thumbnail data download URLs retrieved from the content server 62.

When the thumbnail data download URLs are extracted, the CPU 12 at S204 retrieves coloring information attached to the extracted thumbnail data download URLs, and this flow goes to S206. The CPU 12 at S206 retrieves coloring information corresponding to the text data indicative of the addressee information element regarding the associated information element, which text data is identical with the matched text data, and this flow goes to S208.

The CPU 12 at S208 changes the order of arrangement of the extracted thumbnail data download URLs, based on the coloring information retrieved in the above-described two processings. Specifically, the CPU 12 extracts, from the extracted thumbnail data download URLs, thumbnail data download URLs attached with coloring information which is identical with the coloring information corresponding to the text data indicative of the addressee information element regarding the associated information element. That is, in the case where the coloring information corresponding to the text data indicative of the addressee information element regarding the associated information element is the pink coloring information, the CPU 12 extracts thumbnail data download URLs attached with the pink coloring information, from the extracted thumbnail data download URLs. The CPU 12 then changes the order of arrangement of the thumbnail data download URLs such that the thumbnail data download URLs attached with the pink coloring information are arranged in higher order (earlier), and the thumbnail data download URLs attached with coloring information other than the pink coloring information are arranged in lower order (later).

When the order of arrangement of the thumbnail data download URLs is changed, the CPU 12 at S210 creates the content list based on (i) the thumbnail data download URLs arranged in the changed order and (ii) the identification IDs corresponding to the respective URLs. As a result, the flow of the tag-information-dependent list creating sub-routine and the flow illustrated in FIG. 8 end.

When it is determined, at S104 of the main routine, that no matched text data is contained in the text data indicative of the addressee information element regarding the associated information element, this flow goes to S112. Specifically, in the case where no New Year's card has been created before for the addressee A using the communication system 1, there is no associated information element relating to the addressee A. Thus, in the case where the document 70 on which the addressee information element regarding the addressee A is described is scanned, the text data relating to the addressee A which is retrieved from the image processing server 64 is not contained in the text data indicative of the addressee information element regarding the associated information element, and accordingly this flow goes to S112.

Also when the tag information elements corresponding to the text data indicative of the addressee information elements respectively regarding the plurality of associated information elements, which text data is identical with the matched text data, are acquired at S108 of the main routine, and these tag information elements differ from each other, this flow goes to S112. Specifically, in the case where the New Year's cards have been created in the last year and the year before last for the addressee A using the communication system 1, and the document 70 on which the addressee information element regarding the addressee A is described is scanned in this year, the CPU 12 retrieves the tag information element from the associated information element regarding the last year for the addressee A and retrieves the tag information element from the associated information element regarding the year before last for the addressee A. In this situation, in the case where the tag information element indicative of the associated information element regarding the last year for the addressee A is the first tag information element, and the tag information element indicative of the associated information element regarding the year before last for the addressee A is the second tag information element, for example, this flow goes to S112.

The CPU 12 at S112 creates the content list based on (i) all the thumbnail data download URLs retrieved from the content server 62 and (ii) the identification IDs corresponding to the respective URLs, and this flow ends.

Upon completion of the flow illustrated in FIG. 8, as illustrated in FIG. 3, the control server 10 at M126 transmits the created content list to the MFP 30. At M128, the MFP 30 uses the thumbnail data download URLs of the received content list and their respective identification Ms to send the content server 62 a request of transmission of the thumbnail data. The content server 62 at M130 sends the MFP 30 the plurality of thumbnail data as a response to the request of transmission of the thumbnail data.

The MFP 30 controls the panel 36 to display a plurality of thumbnail images based on the received plurality of thumbnail data. For example, in the case where any one of the image feature check boxes 82 of the document 70 is checked, the panel 36 displays only the thumbnail images corresponding the checked one of the check boxes 82a-82c. That is, in the case where the image feature check box 82a is checked, for example, the panel 36 displays only thumbnail images based on the thumbnail data retrieved using the respective thumbnail data download URLs attached with the first tag information element, that is, the panel 36 displays only the real illustration images. This configuration allows the user to select any image from among the desired thumbnail images.

In the case where any of the image feature check boxes 82 is not checked, and the New Year's card has been created before using the communication system 1, when the user selects an image to be printed on the New Year's card for the addressee of the previous New Year's card, the panel 36 displays only the thumbnail images having the same feature as that of the image printed on the previous New Year's card. That is, in the case where a photo image is previously printed on the New Year's card for the addressee A, and the document 70 on which the addressee information element regarding the addressee A is described is scanned in this year, for example, the panel 36 displays only thumbnail images based on the thumbnail data retrieved using the respective thumbnail data download URLs attached with the second tag information element, that is, the panel 36 displays only photo images. This configuration allows the user to select any image from among the thumbnail images having the same feature as that of the previously selected image, eliminating the need of the user to unnecessarily check images.

In the case where any of the image feature check boxes 82 is not checked, and the New Year's cards have previously been created a plurality of times for the same addressee using the communication system 1 and in the case where the images printed on the New Year's card for the same addressee have the same feature, for example, when the user selects an image to be printed on the New Year's card for the same addressee, the panel 36 displays only thumbnail images having the same feature as that of the image printed on the previous New Year's card. That is, in the case where the New Year's cards have been created in the last year and the year before last for the addressee A using the communication system 1, and the document 70 on which the addressee information element regarding the addressee A is described is scanned in this year and in the case where a pop illustration image is printed on the New Year's card for the addressee A in the last year, and a pop illustration image is printed on the New Year's card for the addressee A in the year before last, for example, the panel 36 displays only thumbnail images based on the thumbnail data retrieved using the respective thumbnail data download URLs attached with the third tag information element, that is, the panel 36 displays only pop illustration images. This configuration allows the user to select any image from among the thumbnail images having the same feature as that of the images previously selected successively.

It is noted that when the panel 36 displays the thumbnail images having the same feature as that of the image printed on the previous New Year's card, the MFP 30 displays the plurality of thumbnail images in the order of the thumbnail data download URLs of the content list. Specifically, in the case where the content list in which the thumbnail data download URLs attached with the pink coloring information are arranged in higher order, and the thumbnail data download URLs attached with the coloring information other than the pink coloring information are arranged in lower order is received by the MFP 30 from the control server 10, for example, the thumbnail images based on the thumbnail data retrieved using the respective thumbnail data download URLs attached with the pink coloring information are displayed in higher order, and the thumbnail images based on the thumbnail data retrieved using the respective thumbnail data download URLs attached with the coloring information other than the pink coloring information are displayed in lower order. That is, the mainly pink thumbnail images are displayed in higher order, and the other thumbnail images are displayed in lower order. This configuration allows the user to view, with higher priority, thumbnail images having colors similar to those of the image selected previously. Accordingly, the user can view the thumbnail images in the order according to preferences of the user.

In the case where any of the image feature check boxes 82 is not checked and in the case where the user selects an image to be printed on a New Year's card for an addressee not having created any New Year's cards before using the communication system 1, the panel 36 displays all the thumbnail images stored in the content server 62. That is, in the case where the document 70 on which the addressee information element regarding the addressee A is described is scanned, and the associated information element retrieved from the storage server 60 does not contain any text data relating to the addressee A, for example, the panel 36 displays all the thumbnail images stored in the content server 62. This configuration allows the user to select any image from among various kinds to thumbnail images when creating a New Year's card for a new addressee.

Also, in the case where any of the image feature check boxes 82 is not checked, and the New Year's cards have previously been created a plurality of times for the same addressee using the communication system 1 and in the case where the images printed on the New Year's card for the same addressee do not have the same feature, for example, when the user selects an image to be printed on the New Year's card for the same addressee, the panel 36 displays all the thumbnail images stored in the content server 62. That is, in the case where the New Year's cards have been created in the last year and the year before last for the addressee A using the communication system 1, and the document 70 on which the addressee information element regarding the addressee A is described is scanned in this year, and in the case where a pop illustration image is printed on the New Year's card for the addressee A in the last year, and a real illustration image is printed on the New Year's card for the addressee A in the year before last, for example, the panel 36 displays all the thumbnail images stored in the content server 62. This configuration allows the user to any image from among the various thumbnail images in the case where the images previously selected do not have the same pattern.

When the plurality of thumbnail images are displayed on the panel 36 as described above, the user at M134 selects a desired one of the thumbnail images from among the plurality of thumbnail images. The MFP 30 at M136 sends the control server 10 information for identifying the selected thumbnail image (hereinafter may be referred to as "identifying information"). Upon receiving the identifying information, the control server 10 at M138 sends the image processing server 64 the identifying information and an instruction for creating an image for the picture surface.

The image processing server 64 at M140 sends the content server 62 a request of transmission of the print image data indicative of the picture surface image which corresponds to the thumbnail image identified by the identifying information. The content server 62 at M142 sends the image processing server 64 the print image data as a response to the request of transmission of the print image data. The image processing server 64 at M144 creates, based on the retrieved print image data, image data based on which an image is to be printed on the picture surface of the New Year's card (noted that the image data may be hereinafter referred to as "picture surface print image data"). The image processing server 64 at M145 transmits the created picture surface print image data to the storage server 60. The image processing server 64 at M146 transmits download information to the control server 10. This download information is constituted by (i) a URL for downloading the picture surface print image data transmitted to the storage server 60 (hereinafter may be referred to as "picture surface print-image-data download URL" (as one example of second surface image information)) and (ii) an identification ID corresponding to the URL.

Upon receiving the download information, the control server 10 at M148 sends the image processing server 64 (i) the scan data and (ii) an instruction for creating an image for an address surface (as one example of a first surface image). The image processing server 64 at M150 creates, based on the retrieved scan data, image data based on which an image is to be printed on the address surface of the New Year's card (noted that the image data may be hereinafter referred to as "address surface print image data"). The image processing server 64 at M151 transmits the created address surface print image data to the storage server 60. The image processing server 64 at M152 transmits download information to the control server 10. This download information is constituted by (i) a URL for downloading the address surface print image data transmitted to the storage server 60 (hereinafter may be referred to as "address surface print-image-data, download URL" (as one example of first surface image information)) and (ii) an identification ID corresponding to the URL.

Upon receiving the download information, the control server 10 at M154 transmits associated information element to the storage server 60. This associated information element includes: text data indicative of the addressee information element which is contained in the scan data used in the creation of the address surface print image data, i.e., the matched text data; and information in which the coloring information and the tag information element attached to the thumbnail data download URL for the thumbnail image corresponding to the print image data used in the creation of the picture surface print image data are associated with each other. The storage server 60 at M156 stores the picture surface print image data, the address surface print image data, and the associated information element and at M158 sends the control server 10 a notification about completion of storing.

Upon receiving the notification about completion of storing, the control server 10 at M160 creates download information regarding both surfaces (sides) of the New Year's card based on the download information regarding the picture surface and the download information regarding the address surface. The control server 10 at M162 sends the MFP 30 the download information regarding both surfaces of the New Year's card. The MFP 30 at M164 uses the picture surface print-image-data download URL and the identification ID for the URL to send the storage server 60 a request of transmission of the picture surface print image data. The storage server 60 at M166 sends the MFP 30 the picture surface print image data as a response to the request of transmission of the picture surface print image data.

Upon receiving the picture surface print image data, the MFP 30 at M168 uses the address surface print-image-data download URL and the identification ID for the URL to send the storage server 60 a request of transmission of the address surface print image data. The storage server 60 at M170 sends the MFP 30 the address surface print image data as a response to the request of transmission of the address surface print image data. The MFP 30 at M172 prints an image on the address surface of the New Year's card based on the address surface print image data and prints an image on the picture surface of the New Year's card based on the picture surface print image data. The MFP 30 at M174 notifies the control server 10 about completion of the printing.

Modifications

In the present embodiment, when the panel 36 displays the thumbnail images having the same feature as that of the image printed on the previous New Year's card, the panel 36 displays only the thumbnail images having the same tag information element as the tag information element regarding the image printed on the previous New Year's card. However, the thumbnail images having the same tag information element as the tag information element regarding the image printed on the previous New Year's card may be displayed on the panel 36 with higher priority among all the thumbnail images. This modification will be explained with a tag-information-dependent list creating sub-routine illustrated in FIG. 10.

Figure 10:
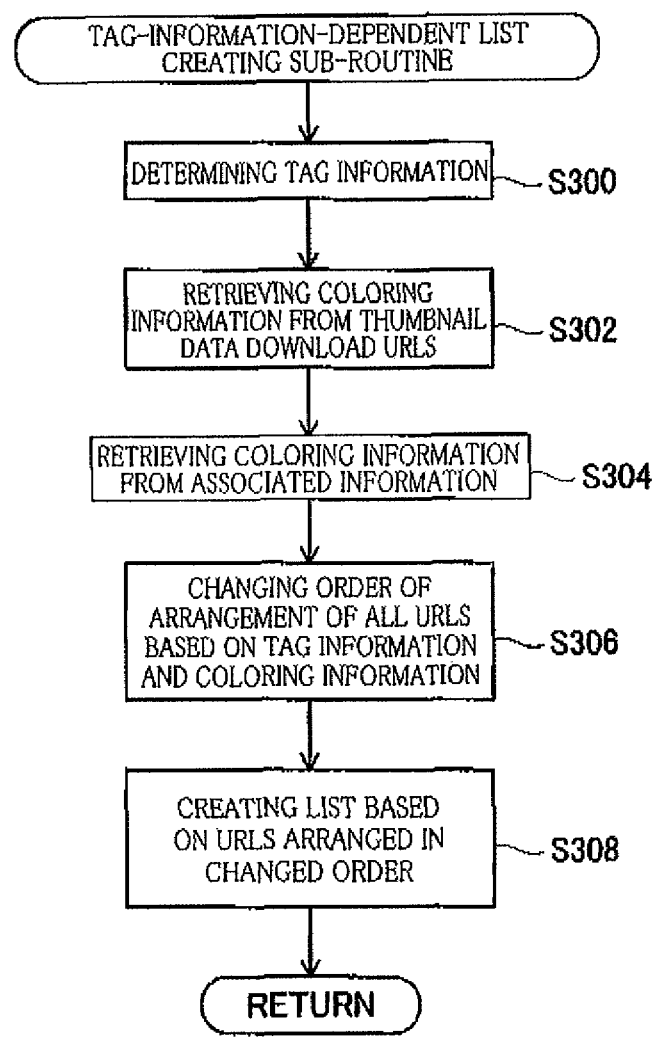
FIG. 10 is a flow chart illustrating processings executed by the control server in a modification.

The tag-information-dependent list creating sub-routine illustrated in FIG. 10 may be executed instead of the tag-information-dependent list creating sub-routine illustrated in FIG. 9. This tag-information-dependent list creating sub-routine illustrated in FIG. 10 begins with S300 at which the CPU 12 determines a tag information element used for creation of the content list as in the above-described processing at S200, and this flow goes to S302. The CPU 12 at S302 retrieves coloring information regarding each of all the thumbnail data download URLs retrieved from the content server 62, and this flow goes to S304. The CPU 12 at S304 retrieves coloring information corresponding to matched text data among the text data indicative of the addressee information element regarding the associated information element, and this flow goes to S306. The CPU 12 at S306 changes the order of arrangement of all the thumbnail data download URLs based on the tag information element and the coloring information.

Specifically, the CPU 12 extracts thumbnail data download URLs attached with the tag information element determined in the above-described processing, from all the thumbnail data download URLs. The CPU 12 then changes the order of arrangement of the thumbnail data download URLs such that the extracted thumbnail data download URLs are arranged in higher order, and the thumbnail data download URLs not extracted are arranged in lower order. The CPU 12 further extracts, from the extracted thumbnail data download URLs, thumbnail data download URLs attached with the same coloring information as the coloring information corresponding to the text data indicative of the addressee information element regarding the associated information element That is, in the case where the coloring information corresponding to the text data indicative of the addressee information element regarding the associated information element is the pink coloring information, the CPU 12 extracts thumbnail data download URLs attached with the pink coloring information, from the extracted thumbnail data download URLs. The CPU 12 then arranges the order of arrangement of the thumbnail data download URLs such that the thumbnail data download URLs attached with the pink coloring information are arranged in higher order, and the thumbnail data download URLs attached with the coloring information other than the pink coloring information are arranged in lower order. That is, the CPU 12 changes the order of arrangement of the thumbnail data download URLs such that the thumbnail data download URLs extracted based on the tag information element and extracted based on the coloring information are arranged in the highest order, then the thumbnail data download URLs extracted based on the tag information element and not extracted based on the coloring information are arranged, and then the thumbnail data download URLs not extracted based on the tag information element are arranged.

When the order of arrangement of the thumbnail data download URLs is changed, the CPU 12 at S308 creates the content list based on (i) the thumbnail data download URLs arranged in the changed order and (ii) the identification IDs corresponding to the respective URLs, and this flow ends. With this configuration, all the thumbnail images are displayed on the panel 36 such that the thumbnail images corresponding to the images having the same feature as that of the picture surface image or images most previously selected are displayed with higher priority than the other images. This configuration allows the user to view, with higher priority, the thumbnail images having the same feature as that of the previously selected image. Also, the user can also view images having features different from the feature of the previously selected image, allowing the user to select a desired image from among more images.

In the above-described embodiment, the thumbnail data download URLs are transmitted from the control server 10 to the MFP 30, and the MFP 30 uses the thumbnail data download URLs to retrieve the thumbnail data from the content server 62. However, the control server 10 may transmit the thumbnail data to the MFP 30.

In the above-described embodiment, the OCR is performed in the analysis of the scan data by the image processing server 64, and the text data indicative of the addressee information element is formed based on the scan data created from the document 70. However, the image data regarding the addressee information element may be formed without performing the OCR. After forming of the image data regarding the addressee information element, image matching may be performed between the image data regarding the addressee information element of the associated information element and the image data regarding the addressee information element which can be acquired from the scan data to compare the addressee information elements with each other. That is, a technique of template matching may be used to compare the image data regarding the addressee information element of the associated information element and the image data regarding the addressee information element which can be acquired from the scan data with each other. In the case where the image data regarding the addressee information element of the associated information element retrieved from the storage server 60 contains image data (hereinafter may be referred to as "matched image data") indicating the same addressee as that of the addressee information element retrieved from the image processing server 64, the associated information element regarding the matched image data may be processed in a manner that is the same as a manner in which the associated information element regarding the matched image data is processed in the above-described embodiment.

In the above-described embodiment, the OCR is performed in the analysis of the scan data by the image processing server 64 to form the text data indicative of the addressee information element based on the scan data created from the document 70. Instead of the OCR, however, this communication system 1 may be configured such that the scan data is transmitted to a cloud service which extracts text information from image data, and the text information transmitted from the cloud service is used as the text data indicative of the addressee information element.

In the above-described embodiment, in the case where the New Year's cards have previously been created a plurality of times for the same addressee using the communication system 1 and in the case where the images printed on the New Year's card for the same addressee do not have the same feature, when the user selects an image to be printed on the New Year's card for the same addressee, the panel 36 displays all the thumbnail images stored in the content server 62. However, the panel 36 may display only thumbnail images extracted based on the tag information element. Specifically, in the case where the New Year's cards have been created in the last year and the year before last for the addressee A using the communication system 1, and even in the case where when the document 70 on which the addressee information element regarding the addressee A is described is scanned in this year, a pop illustration image is printed on the New Year's card for the addressee A in the last year, and a real illustration image is printed on the New Year's card for the addressee A in the year before last, the panel 36 may display only the pop illustration image printed on the New Year's card for the addressee A in the last year.

The associated information element is transmitted from the control server 10 to the storage server 60 and stored in the storage server 60 in the above-described embodiment but may be stored in the control server 10. That is, the processings in the control server 10 and the processings in the storage server 60 may be executed by one device.

In the present embodiment, the CPU 12 executes various kinds of processings according to the control program 22*a* in the control server 10, but the present invention is not limited to this configuration. For example, the CPU 12 may instruct the OS 22*b*, another system, or hardware to execute the various kinds of processings according to the control program 22*a*.

The technical components described in the present specification or the drawings exhibit technical utility individually or in various combinations, and are not limited to the combinations disclosed in the claims at the time of application. Furthermore, the techniques illustrated in the present specification or the drawings may simultaneously achieve a plurality of objects, and has technical utility by achieving one of these objects.

It is noted that each program may be constituted by a single program module or a plurality of program modules. Each of the above-described examples may be in other forms as long as the similar function is exhibited. For example, each example may be: a computer, e.g., the CPU 12, for executing processings based on a program (e.g., the control program 22a); a computer for executing processings based on a program different from the print program, e.g., an operating system and other applications and programs; hardware operable according to instructions supplied from a computer; and a configuration in which a computer and hardware cooperate. It should be understood that each example may be a computer configured to execute processings by executing processings according to a plurality of programs and may be hardware operable by instructions supplied from a computer configured to execute processings by executing processings according to a plurality of programs.

The programs in the above-described embodiment may be stored in a storage medium readable by a computer. Examples of the storage medium readable by the computer include: a CD-ROM; a DVD-ROM; and a storage device mounted on a server device which is connectable to the control server 10 via a communication network. The programs stored in the storage device of the server device may be distributed via the communication network (e.g., Internet) by the signal medium readable by the computer.

What is claimed is:

1. A non-transitory storage medium storing a plurality of instructions executable by a processor of an information processing server, the information processing server comprising the processor and a communication device configured to communicate with a device capable of executing a print processing and a scan processing, the plurality of instructions, when executed by the processor, causing the information processing server to:

receive scan information from the device via the communication device, the scan information relating to a reading object on which a delivery address to be printed on a first surface of a delivery object is described, the scan information being acquired in the scan processing executed by the device for the reading object;

transmit content information to the device via the communication device, the content information comprising sample image information for displaying a plurality of sample images respectively corresponding to a plurality of second surface images comprising a second surface image to be printed on a second surface of the delivery object;

receive identifying information from the device via the communication device, the identifying information identifying a sample image selected on the device among the plurality of sample images displayed using the sample image information of the transmitted content information;

acquire first surface image information for identifying a first surface image created based on the received scan information, the first surface image being for printing of the delivery address on the first surface of the delivery object;

acquire second surface image information for identifying the second surface image to be printed on the second surface of the delivery object, the second surface image corresponding to the sample image identified by the received identifying information;

transmit the acquired first surface image information and the acquired second surface image information to the device via the communication device;

associate (a) delivery address information indicating the delivery address and comprised in the scan information used for creation of the first surface image information and (b) first feature information indicating a feature of the second surface image corresponding to the acquired second surface image information, with each other and output the delivery address information and the first feature information to a memory;

read the delivery address information and the first feature information associated with each other, from the memory when scan information which is newer than the received scan information is newly received; and extract sample image information when the read delivery address information is identical with the delivery address information comprised in the newly-received scan information, the sample image information being for displaying a sample image corresponding to the second surface image comprising the feature indicated by the first feature information associated with the read delivery address information.

2. The non-transitory storage medium according to claim 1, wherein when executed by the processor, the plurality of instructions cause the information processing server to transmit content information to the device via the communication device, the content information comprising the sample image information for displaying at least two sample images respectively corresponding to at least two second surface images of the plurality of second surface images which are classified into a plurality of categories according to a first rule, and wherein the first feature information indicates a feature of the at least two second surface images respectively corresponding to the at least two sample images to be displayed based on the sample image information comprised in the transmitted content information.

3. The non-transitory storage medium according to claim 2, wherein when executed by the processor, the plurality of instructions cause the information processing server to, when the read delivery address information is identical with the delivery address information comprised in the newly-received scan information, extract the content information comprising the sample image information for displaying the at least two sample images comprising the sample image corresponding to the second surface image comprising the feature indicated by the first feature information associated with the read delivery address information.

4. The non-transitory storage medium according to claim 3, wherein when executed by the processor, the plurality of instructions cause the information processing server to:

associate the delivery address information, the first feature information, and second feature information with each other and output the delivery address information, the first feature information, and the second feature information to the memory, the second feature information indicating a feature used when the plurality of second surface images respectively corresponding to the plurality of sample images to be displayed using the sample image information comprised in the content information are classified according to a second rule different from the first rule, the second feature information being comprised in the second surface image corresponding to the classified sample image;
read the delivery address information, the first feature information, and the second feature information associated with each other, from the memory when the scan information is newly received; and
extract the sample image information for displaying the sample image corresponding to the second surface image comprising the feature indicated by the second feature information associated with the read delivery address information, from the sample image information comprised in the extracted content information, when the read delivery address information is identical with the delivery address information comprised in the newly-received scan information.

5. The non-transitory storage medium according to claim 1, wherein when executed by the processor, the plurality of instructions cause the information processing server to extract, when the read delivery address information comprises a plurality of sets of the delivery address information each identical with the delivery address information comprised in the newly-received scan information, the sample image information for displaying the sample image corresponding to the second surface image comprising the feature indicated by the first feature information most recently output to the memory among a plurality of sets of the first feature information associated with the plurality of sets of read delivery address information.

6. The non-transitory storage medium according to claim 1, wherein when executed by the processor, the plurality of instructions cause the information processing server to perform:
when the read delivery address information comprises a plurality of sets of delivery address information each identical with the delivery address information comprised in the newly-received scan information and when the first feature information most recently output to the memory among a plurality of sets of the first feature information associated with the plurality of sets of read delivery address information is identical with the first feature information output to the memory previous to the first feature information most recently output to the memory, extracting the sample image information for displaying the sample image corresponding to the second surface image comprising the feature indicated by the first feature information most recently output to the memory; and
not extracting the sample image information when the read delivery address information comprises the plurality of sets of delivery address information each identical with the delivery address information comprised in the newly-received scan information and when the first feature information most recently output to the memory is not identical with the first feature information output to the memory previous to the first feature information most recently output to the memory.

7. The non-transitory storage medium according to claim 1, wherein when executed by the processor, the plurality of instructions cause the information processing server to:
transmit only the extracted sample image information to the device via the communication device;
receive the identifying information from the device via the communication device, the identifying information identifying the sample image selected on the device among the plurality of sample images displayed using the transmitted sample image information;
create the first surface image information based on the newly-received scan information;
acquire the second surface image information regarding the second surface image corresponding to the sample image identified by the received identifying information; and
transmit the created first surface image information and the acquired second surface image information to the device via the communication device.

8. The non-transitory storage medium according to claim 1, wherein when executed by the processor, the plurality of instructions cause the information processing server to:
transmit extracted sample information as the extracted sample image information and the sample image information different from the extracted sample information, via the communication device such that the sample image to be displayed using the extracted sample information is displayed on a display of the device with higher priority than the sample image to be displayed using the sample image information different from the extracted sample information;
receive the identifying information from the device via the communication device, the identifying information identifying the sample image selected on the device among a plurality of sample images displayed based on the transmitted extracted sample information and the sample image information different from the extracted sample information;
create the first surface image information based on the newly-received scan information;
acquire the second surface image information regarding the second surface image corresponding to the sample image identified by the received identifying information; and
transmit the created first surface image information and the acquired second surface image information to the device via the communication device.

9. A communication system, comprising:
a device capable of executing a print processing and a scan processing; and
an information processing server comprising: a communication device configured to communicate with the device; and a controller configured to:
receive scan information from the device via the communication device, the scan information relating to a reading object on which a delivery address to be printed on a first surface of a delivery object is described, the scan information being acquired in the scan processing executed by the device for the reading object;
transmit content information to the device via the communication device, the content information comprising sample image information for displaying a plurality of sample images respectively corresponding to a plurality of second surface images comprising a second surface image to be printed on a second surface of the delivery object;
receive identifying information from the device via the communication device, the identifying information identifying a sample image selected on the device among the plurality of sample images displayed using the sample image information of the transmitted content information;
acquire first surface image information for identifying a first surface image created based on the received scan information, the first surface image being for printing of the delivery address on the first surface of the delivery object;

acquire second surface image information for identifying the second surface image to be printed on the second surface of the delivery object, the second surface image corresponding to the sample image identified by the received identifying information;

transmit the acquired first surface image information and the acquired second surface image information to the device via the communication device;

associate (a) delivery address information indicating the delivery address and comprised in the scan information used for creation of the first surface image information and (b) first feature information indicating a feature of the second surface image corresponding to the acquired second surface image information, with each other and output the delivery address information and the first feature information to a memory;

read the delivery address information and the first feature information associated with each other, from the memory when scan information which is newer than the received scan information is newly received; and extract sample image information when the read delivery address information is identical with the delivery address information comprised in the newly-received scan information, the sample image information being for displaying a sample image corresponding to the second surface image comprising the feature indicated by the first feature information associated with the read delivery address information.

10. An information processing server, comprising:

a communication device configured to communicate with a device capable of executing a print processing and a scan processing; and a controller configured to:

receive scan information from the device via the communication device, the scan information relating to a reading object on which a delivery address to be printed on a first surface of a delivery object is described, the scan information being acquired in the scan processing executed by the device for the reading object;

transmit content information to the device via the communication device, the content information comprising sample image information for displaying a plurality of sample images respectively corresponding to a plurality of second surface images comprising a second surface image to be printed on a second surface of the delivery object;

receive identifying information from the device via the communication device, the identifying information identifying a sample image selected on the device among the plurality of sample images displayed using the sample image information of the transmitted content information;

acquire first surface image information for identifying a first surface image created based on the received scan information, the first surface image being for printing of the delivery address on the first surface of the delivery object;

acquire second surface image information for identifying the second surface image to be printed on the second surface of the delivery object, the second surface image corresponding to the sample image identified by the received identifying information;

transmit the acquired first surface image information and the acquired second surface image information to the device via the communication device;

associate (a) delivery address information indicating the delivery address and comprised in the scan information used for creation of the first surface image information and (b) first feature information indicating a feature of the second surface image corresponding to the acquired second surface image information, with each other and output the delivery address information and the first feature information to a memory;

read the delivery address information and the first feature information associated with each other, from the memory when scan information which is newer than the received scan information is newly received; and extract sample image information when the read delivery address information is identical with the delivery address information comprised in the newly-received scan information, the sample image information being for displaying a sample image corresponding to the second surface image comprising the feature indicated by the first feature information associated with the read delivery address information.

* * * * *